(12) United States Patent
DeKam et al.

(10) Patent No.: US 11,419,255 B2
(45) Date of Patent: Aug. 23, 2022

(54) WHEEL CARRIER SYSTEM

(71) Applicant: CNH Industrial America LLC, New Holland, PA (US)

(72) Inventors: Monte DeKam, Westmont, IL (US); Kregg J. Raducha, Chicago, IL (US); Leonardo Reis Menezes, Piracicaba (BR); Austin Joseph McLuckie, Coal City, IL (US)

(73) Assignee: CNH Industrial America LLC, New Holland, PA (US)

( * ) Notice: Subject to any disclaimer, the term of this patent is extended or adjusted under 35 U.S.C. 154(b) by 305 days.

(21) Appl. No.: 16/673,597

(22) Filed: Nov. 4, 2019

(65) Prior Publication Data

US 2021/0127548 A1 May 6, 2021

(51) Int. Cl.
*A01B 63/32* (2006.01)
*A01B 63/22* (2006.01)
*A01B 15/20* (2006.01)
*A01B 15/16* (2006.01)

(52) U.S. Cl.
CPC .............. *A01B 63/32* (2013.01); *A01B 15/20* (2013.01); *A01B 63/22* (2013.01); *A01B 15/16* (2013.01)

(58) Field of Classification Search
CPC ......... A01B 63/32; A01B 63/22; A01B 15/20; A01B 15/16
USPC .......................................................... 172/398
See application file for complete search history.

(56) References Cited

U.S. PATENT DOCUMENTS

| | | | |
|---|---|---|---|
| 4,108,249 A * | 8/1978 | Anderson et al. ..... | A01B 63/22 172/328 |
| 4,139,065 A | 2/1979 | Lewison | |
| 4,371,039 A * | 2/1983 | Schaaf et al. .......... | A01B 63/32 172/244 |
| 4,379,491 A * | 4/1983 | Riewerts et al. ...... | A01B 63/22 172/328 |
| 4,594,951 A | 6/1986 | Grataloup | |
| 6,003,616 A | 12/1999 | Goins et al. | |
| 6,745,848 B1 | 6/2004 | Mosdal et al. | |
| 7,044,070 B2 | 5/2006 | Kaster et al. | |
| 7,240,625 B2 | 7/2007 | Wendte et al. | |
| 8,186,449 B2 | 5/2012 | Hackert et al. | |
| 8,261,845 B2 | 9/2012 | Palen | |
| 9,556,902 B2 | 1/2017 | Blunier et al. | |

(Continued)

FOREIGN PATENT DOCUMENTS

WO 2018109543 A1 6/2018

*Primary Examiner* — Tara Mayo-Pinnock
(74) *Attorney, Agent, or Firm* — Rebecca L. Henkel; Rickard K. DeMille

(57) ABSTRACT

A system that includes a wheel carrier system. The wheel carrier system includes a first wheel that couples to a first shaft. A first connector couples the first shaft to a central shaft. A second wheel couples to a second shaft. A second connector couples the second shaft to the central shaft. The first wheel and the second wheel independently rotate and move vertically. A first wheel carrier arm couples to a wheel carrier frame. A first link rotates a ground engaging tool system with respect to the wheel carrier frame to transition the ground engaging tool system from a lowered position to a raised position. An actuator simultaneously rotates the first wheel carrier arm from a first position to a second position and the ground engaging tool system from the lowered position to the raised position.

20 Claims, 6 Drawing Sheets

(56) References Cited

U.S. PATENT DOCUMENTS 10,080,322 B2 9/2018 Redekop et al.
2005/0241840 A1* 11/2005 Steinlage et al. ...... A01B 63/22
172/452

* cited by examiner

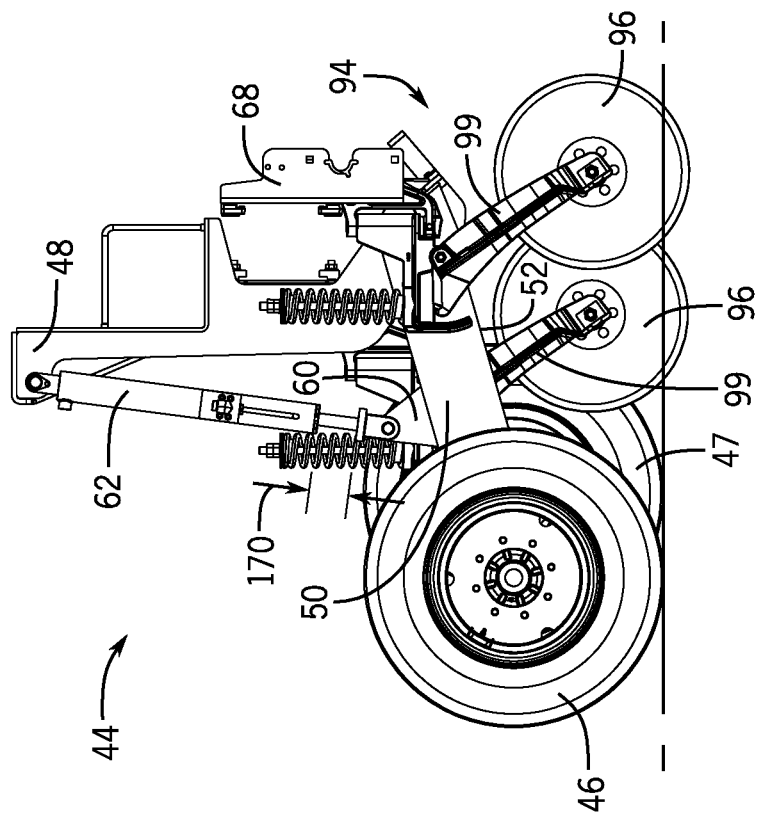
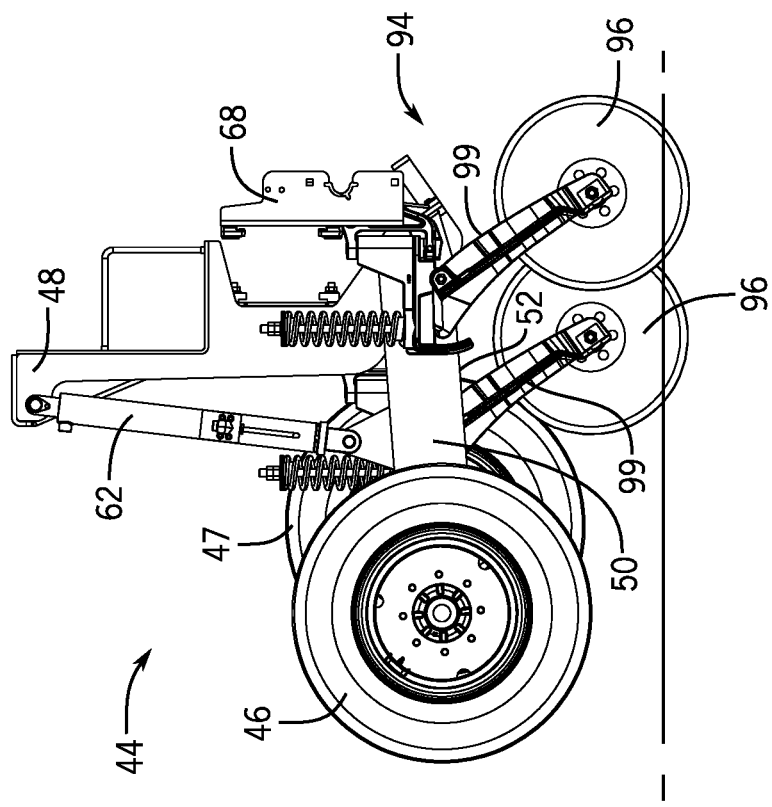

WHEEL CARRIER SYSTEM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to a planting implement.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube or powered agricultural product conveyor) is configured to deposit agricultural products (e.g., seed, fertilizer) into the trench. The opener and agricultural product conveying system are followed by closing discs that move displaced soil back into the trench and a packer wheel that packs the soil on top of the agricultural product. During operation, the planter may operate in two configurations a raised configuration and a lowered configuration. In the raised configuration, the planter lifts the row units to facilitate travel to and from different locations (e.g., fields, maintenance facility). In the lowered configuration, the planter engages the soil with the row units to deposit agricultural product (e.g., seeds, fertilizer). Unfortunately, the increasing number of row units on planters creates torsion on the frame.

BRIEF DESCRIPTION

This brief description is provided to introduce a selection of concepts that are further described below in the detailed description. This summary is not intended to identify key or essential features of the claimed subject matter, nor is it intended to be used as an aid in limiting the scope of the claimed subject matter.

In one example, a system that includes a wheel carrier system. The wheel carrier system includes a first wheel that couples to a first shaft. A first connector couples the first shaft to a central shaft. A second wheel couples to a second shaft. A second connector couples the second shaft to the central shaft. The first wheel and the second wheel independently rotate and move vertically. A first wheel carrier arm couples to a wheel carrier frame. A first link rotates a ground engaging tool system with respect to the wheel carrier frame to transition the ground engaging tool system from a lowered position to a raised position. An actuator simultaneously rotates the first wheel carrier arm from a first position to a second position and the ground engaging tool system from the lowered position to the raised position.

In another example, an agricultural implement system that includes a row unit. The row unit includes a ground engaging tool system that engages soil with a ground engaging tool. A wheel carrier system couples to the ground engaging tool system. A first wheel carrier arm couples to a first wheel and to a wheel carrier frame. A second wheel carrier arm couples to a second wheel and to the wheel carrier frame. A first link rotates the ground engaging tool system to transition the ground engaging tool system from a lowered position to a raised position. An actuator simultaneously rotates the first wheel carrier arm and the second wheel carrier arm from a first position to a second position and the ground engaging tool system from the lowered position to the raised position.

In another example, an agricultural implement system includes a row unit that couples to a toolbar. The row unit includes a ground engaging tool system that engages the soil with a ground engaging tool. A wheel carrier system that couples to the toolbar and to the ground engaging tool system. A wheel carrier arm couples to a wheel and to a wheel carrier frame. A link rotates the ground engaging tool system to transition the ground engaging tool system from a lowered position to a raised position. An actuator simultaneously rotates the wheel carrier arm from a first position to a support position without rotating the ground engaging tool system out of the ground.

DRAWINGS

These and other features, aspects, and advantages of the present disclosure will become better understood when the following detailed description is read with reference to the accompanying drawings in which like characters represent like parts throughout the drawings, wherein:

FIG. 6 is a side view of a wheel carrier system in a lowered configuration, according to embodiments of the present disclosure; and FIG. 7 is a side view of a wheel carrier system in a support configuration, according to embodiments of the present disclosure.

DETAILED DESCRIPTION

Figure 1:
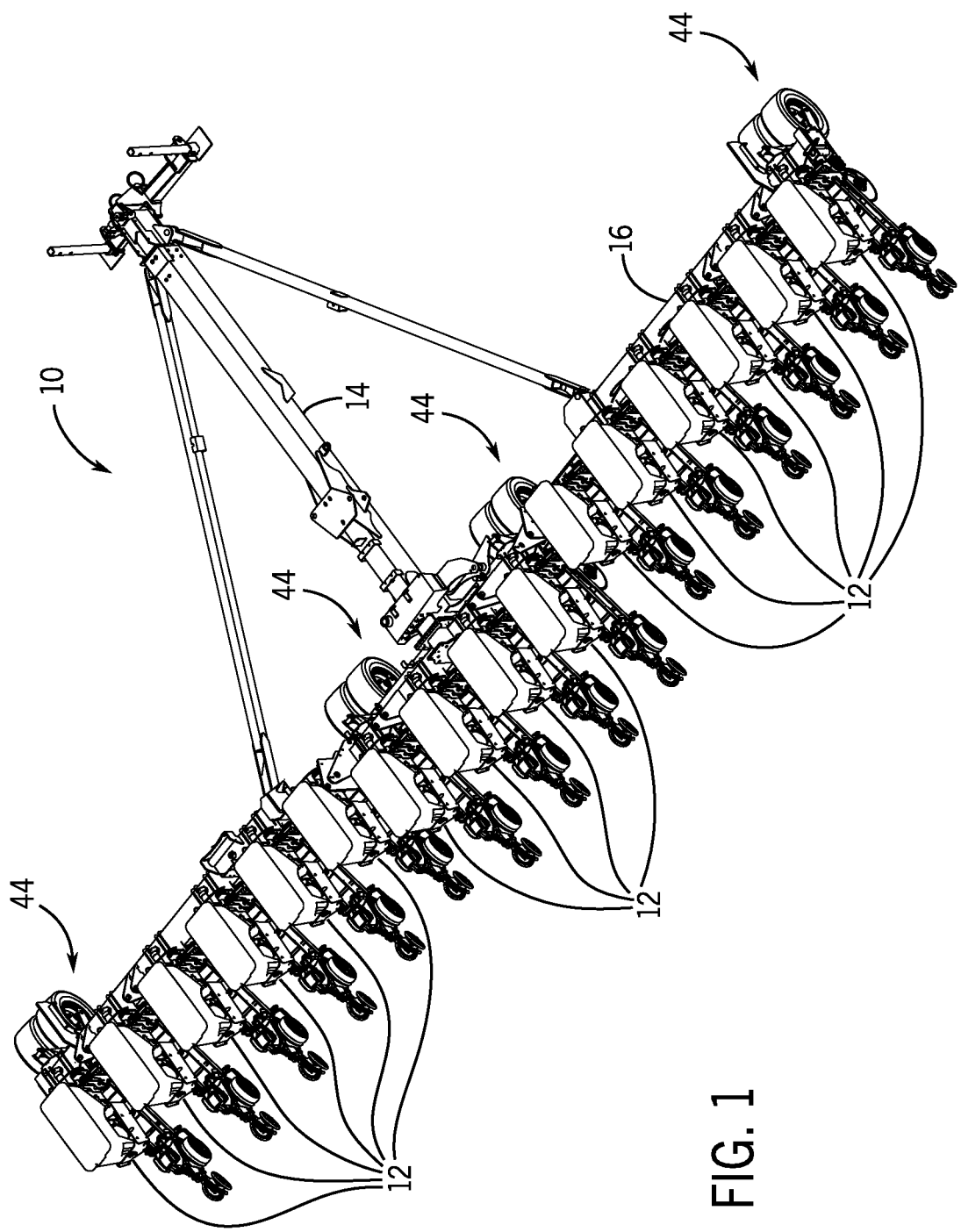
FIG. 1 is a perspective view of an embodiment of an agricultural implement having multiple row units distributed across a width of the agricultural implement, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items.

Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Embodiments of the present disclosure relate generally to a wheel carrier system that transitions an agricultural implement (e.g., row units on the agricultural implement) from a lowered/ground engaging configuration to a raised/transport configuration. The wheel carrier system includes a link system that couples to a ground engaging system of the row unit. In operation, the wheel carrier system transfers motion through the link system to the ground engaging system. More specifically, the link system rotates ground engaging tools of the ground engaging system away from wheels on the wheel carrier system. Rotation of the ground engaging tools away from the wheels blocks contact between the ground engaging tools and the wheels as the agricultural implement transitions from a lowered/ground engaging configuration to a raised/transport configuration.

FIG. 1 is a perspective view of an embodiment of an agricultural implement 10 (e.g., planting implement) having multiple row units 12 distributed across a width of the agricultural implement 10. The agricultural implement 10 is configured to be towed through a field behind a work vehicle, such as a tractor. The agricultural implement couples to a work vehicle with a tongue assembly 14, which includes a hitch configured to couple the agricultural implement 10 to an appropriate tractor hitch (e.g., via a ball, clevis, or other coupling). The tongue assembly 14 is coupled to a frame 16 (e.g., toolbar or toolbars) that supports multiple row units 12. Each row unit 12 may include one or more opener discs configured to form a seed path (e.g., trench) within soil of a field. The row unit 12 may also include an agricultural product conveying system (e.g., seed tube or powered agricultural product conveyer) configured to deposit agricultural product (e.g., fertilizer, seeds) into a trench. In addition, the row unit 12 may include closing disc(s) and/or a packer wheel positioned behind the agricultural product conveying system. The closing disc(s) are configured to move displaced soil back into the seed path/trench, and the packer wheel is configured to pack soil on top of the deposited seeds/other agricultural product(s).

In order to support the weight of the row units 12 and frame 16, the agricultural implement 10 may include a wheel carrier system(s) 44. The wheel carrier system 44 may reduce torsion on the frame 16 created by the weight of the row units 12. The wheel carrier system 44 may also facilitate transition of the agricultural implement 10 from a lowered/ground engaging configuration to a raised/travel configuration depending on the mode of operation of the agricultural implement 10.

Figure 2:
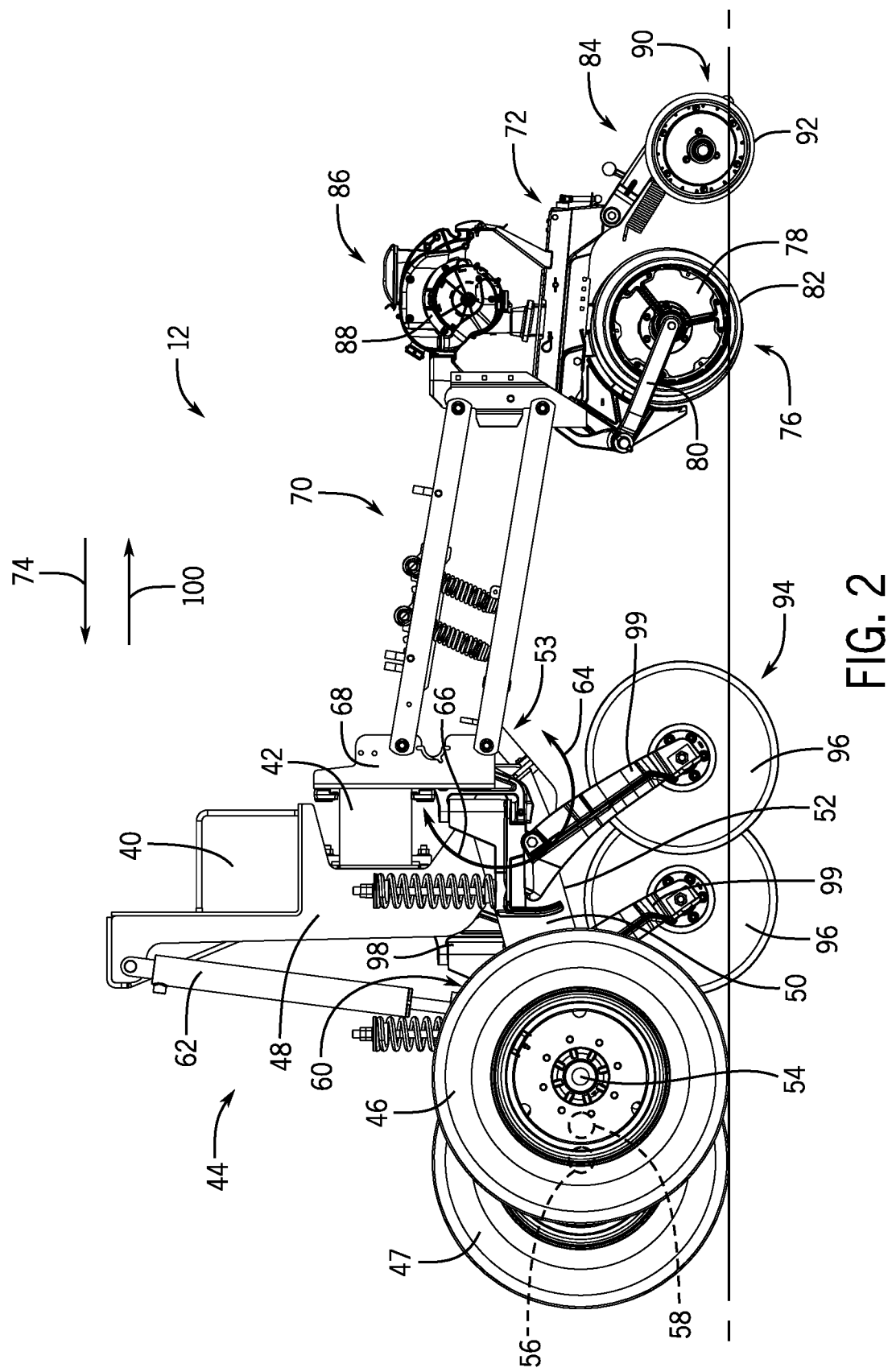
FIG. 2 is a side view of an embodiment of a row unit in a lowered configuration that may be employed on the agricultural implement of FIG. 1, according to embodiments of the present disclosure.

FIG. 2 is a side view of an embodiment of a row unit 12 (e.g., agricultural row unit) in a lowered configuration that may be employed on the agricultural implement of FIG. 1. As explained above, the row unit 12 couples to the frame 16. The frame 16 may include a first toolbar 40 and a second toolbar 42. The first toolbar 40 may be configured to support the wheel carrier system 44, while the second toolbar 42 may be configured to support the row units 12. In order to raise and lower the row units 12, agricultural implement 10 includes the wheel carrier system 44. The wheel carrier system 44 is configured to raise and lower wheels 46 and 47 to transition the agricultural implement 10 (e.g., row units 12) from a lowered/planting configuration to a raised/travel configuration.

The wheel carrier system 44 includes a wheel carrier frame 48 (e.g., housing) that couples to and supports wheel carrier arms 50, 52 with rotating connections 53 (e.g., pivot connections). As will be explained in further detail below, the wheels 46, 47 couple to respective wheel shafts 54, 56 that enable the wheels 46, 47 to independently rotate as well as move vertically (e.g., the wheels 46, 47 can rotate about a central shaft). The wheel shafts 54, 56 couple to a central shaft 58 supported by a shaft housing (e.g., shaft housing 150 seen in FIG. 5). Wheel carrier arms 50, 52 couple to the shaft housing and may support flanges 60 that enable an actuator or actuators 62 to couple to the wheel carrier arms 50 and 52. As illustrated, the actuators 62 couple to the frame 48 and to flanges 60. The actuator 62 may be a hydraulic actuator (e.g., hydraulic piston), pneumatic actuator (e.g., pneumatic piston), electric actuator, or a combination thereof. In operation, the actuators 62 extend and retract to rotate the wheel carrier arms 50 and 52 with respect to the frame 48. For example, extension of the actuators 62 rotates the wheel carrier arms 50, 52 and the wheels 46, 47 in direction 64 about the rotating or pivot connections 53. Likewise, retraction of the actuator 62 will rotate the wheel carrier arms 50, 52 and wheels 46, 47 in direction 66 about the rotating connection 53. As the wheel carrier arms 50, 52 rotate in direction 64, the wheel carrier system 44 lifts the frame 16, which then transitions the row unit 12 from a lowered position to a raised position.

The row unit 12 includes a mount 68 configured to secure the row unit 12 to the frame 16 (e.g., second toolbar 42) of the agricultural implement 10. A linkage assembly 70 extends from the mount 68 to a row unit frame 72 of the row unit 12. The linkage assembly 70 enables vertical movement of the frame 72 relative to the frame 16 in response to variations in a soil surface. In certain embodiments, a down pressure system (e.g., including a hydraulic actuator, a pneumatic actuator) may couple to the linkage assembly 70 and drive the frame 72 toward the soil surface. While the illustrated linkage assembly 70 is a parallel linkage assembly (e.g., a four-bar linkage assembly), in alternative embodiments, another suitable linkage assembly may extend between the mount 68 and the frame 16.

The row unit 12 is configured to deposit seeds and/or other agricultural product(s) at a desired depth beneath the soil surface as the row unit 12 traverses a field along a direction of travel 74. The row unit 12 includes an opener assembly 76 that forms a trench in the soil for agricultural product deposition into the soil. In the illustrated embodiment, the opener assembly 76 includes gauge wheels 78, arms 80 that pivotally couple the gauge wheels 78 to the frame 72, and opener discs 82. The opener discs 82 are configured to excavate a trench into the soil, and the gauge wheels 78 are configured to control a penetration depth of the opener discs 82 into the soil. In some embodiments, the row unit 12 includes a depth control system 84 configured to control the vertical position of the gauge wheels 78 (e.g., by blocking rotation of the arms in the upward direction beyond a selected orientation), thereby controlling the penetration depth of the opener discs 82 into the soil.

The row unit 12 also includes an agricultural product conveying system 86 (e.g., seed tube or powered agricultural product conveyor) configured to deposit seeds and/or other agricultural product(s) (e.g., fertilizer) into the trench. In some embodiments, the agricultural product conveying system 86 may include a product metering system 88 (e.g., seed meter). The opener assembly 76 and the agricultural product conveying system 86 are followed by a closing assembly 90 that moves displaced soil back into the trench. In the illustrated embodiment, the closing assembly 90 includes two closing discs 92. However, in alternative embodiments, the closing assembly 90 may include other closing devices (e.g., a single closing disc, etc.). In some embodiments, the closing assembly 90 may be omitted.

The product metering system 88 is configured to receive agricultural product (e.g., seeds) from a hopper coupled to the row unit 12 and/or from a tube that couples to a product tank on the agricultural implement 10. In certain embodiments, the product metering system 88 may be a vacuum seed meter that includes a disc with multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, in alternative embodiments, other suitable seed/agricultural product meters may be utilized. As used herein, "vacuum" refers to an air pressure that is less than the ambient atmospheric air pressure, and not necessarily 0 pa.

As illustrated, the row unit 12 may also include a ground engaging tool system 94 (e.g., a coulter system). The ground engaging tool system 94 may cut plant debris (e.g., roots, stalks) and/or cut a trench to facilitate fertilizer placement in the soil. The ground engaging tool system 94 includes ground engaging tools 96 (e.g., coulters). The ground engaging tools 96 couple to respective frames 98 (e.g., ground engaging tool frames) with arms 99. As will be explained below, the frames 98 may pivotally couple to the mount 68 enabling the ground engaging tool system 94 to rotate relative to the mount 68. The ability of the ground engaging tool system 94 to rotate enables the ground engaging tool(s) 96 to rotate away from the wheels 46, 47 as the agricultural implement 10 transitions from a lowered configuration to a raised configuration. In other words, rotation of the ground engaging tool system 94 blocks contact between the wheels 46, 47 and the ground engaging tools 96 as the wheels 46, 47 move in direction 100.

Figure 3:
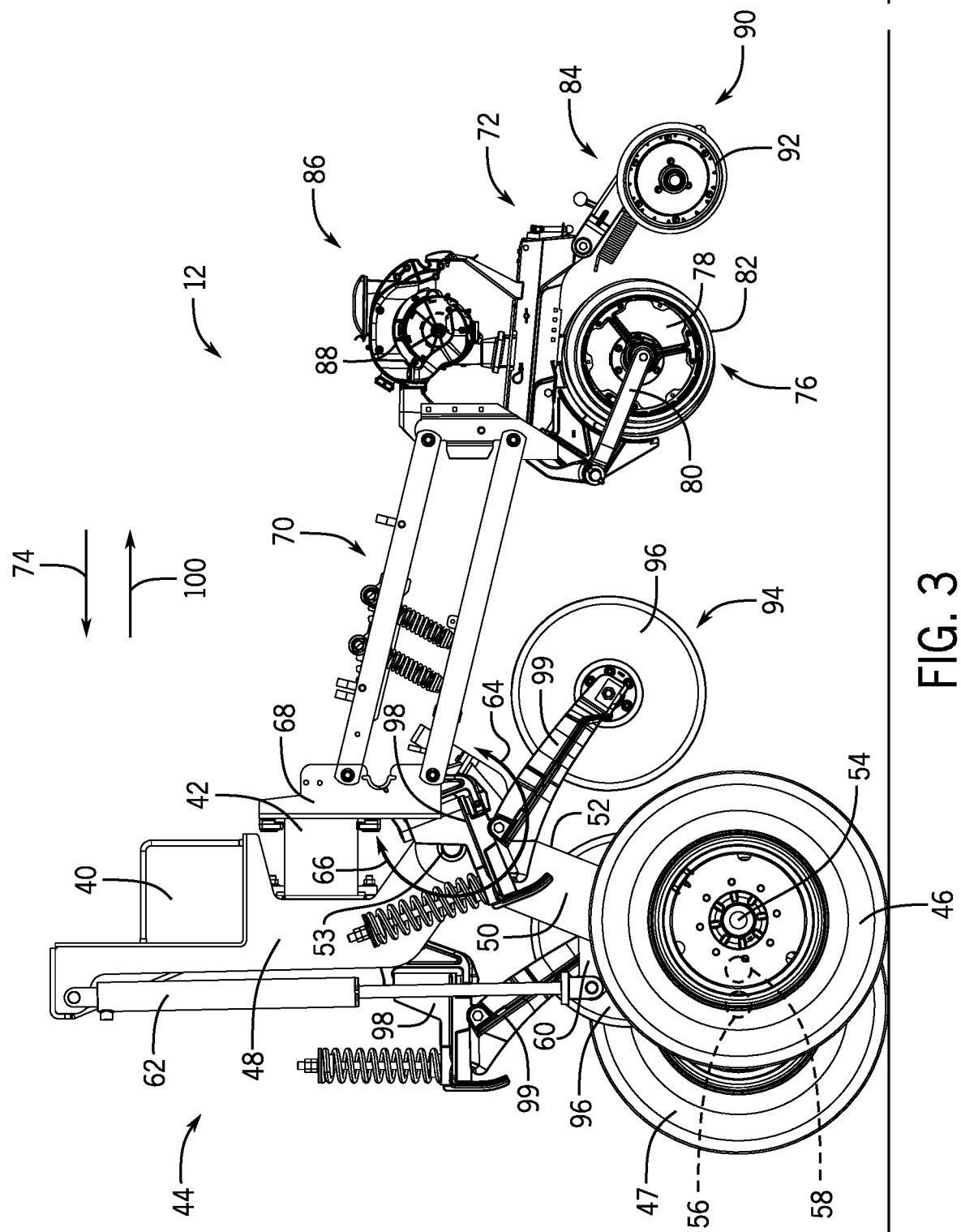
FIG. 3 is a side view of an embodiment of the row unit of FIG. 2 in a raised configuration, according to embodiments of the present disclosure.

FIG. 3 is a side view of an embodiment of the wheel carrier system 44 in a raised configuration and the row unit 12 of FIG. 2 in a raised configuration. As explained above, the actuators 62 extend and retract to drive rotation of the wheel carrier arms 50 and 52 with respect to the frame 48. In FIG. 3 the actuators 62 are in an extended position. As the actuators 62 extend, the actuators 62 drive rotation of the wheel carrier arms 50, 52 and the wheels 46, 47 in direction 64 about the rotating connections 53. As the wheel carrier arms 50, 52 rotate in direction 64, the wheel carrier system 44 lifts the frame 16 and by extension the row unit 12 from a lowered position to a raised position. In addition to lifting the row unit 12, the wheel carrier system 44 also drives rotation of the ground engaging tool system 94. As explained above, rotation of the ground engaging tool system 94 blocks contact between the wheels 46, 47 and the ground engaging tools 96 as the wheels 46, 47 move in direction 100.

Figure 4:
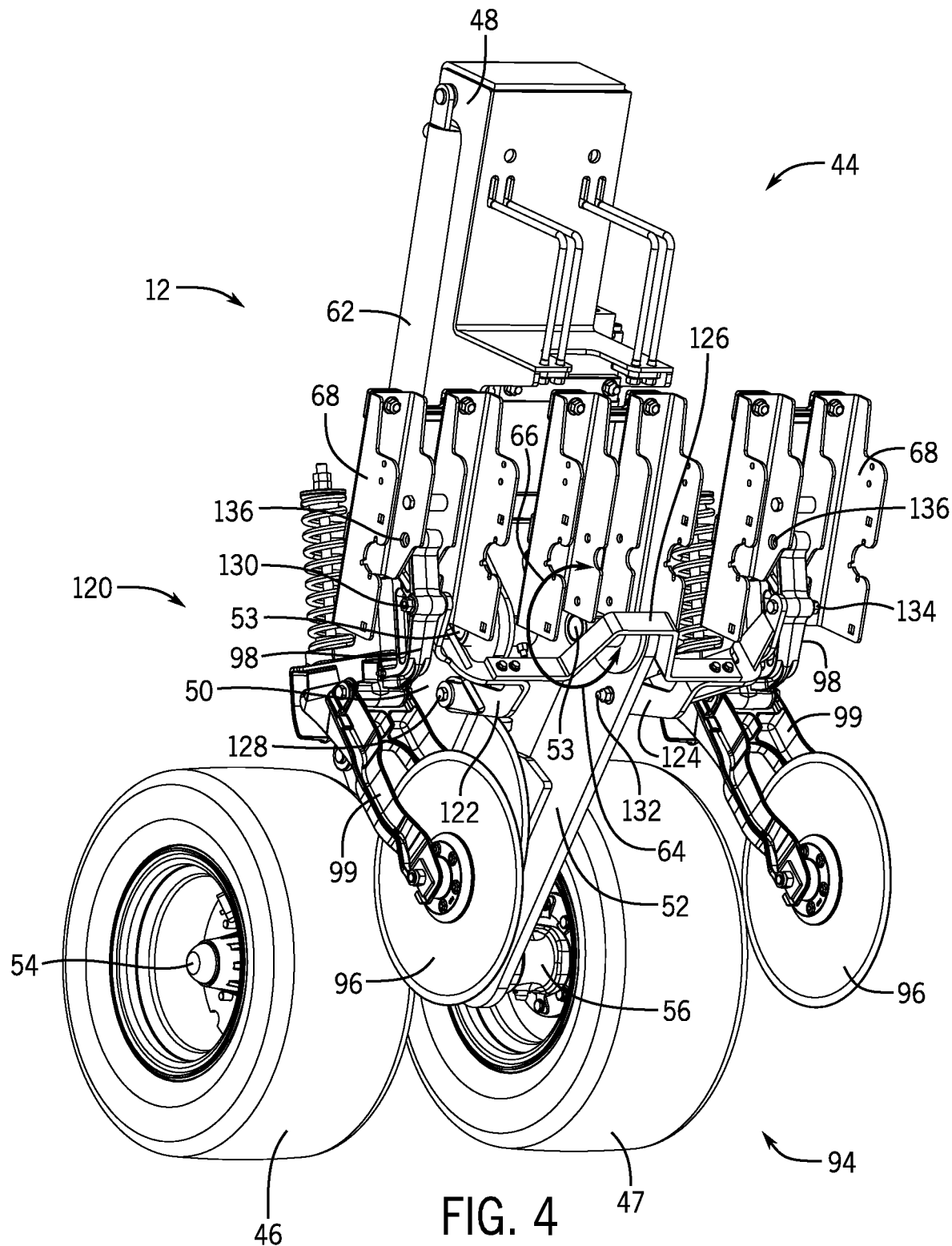
FIG. 4 is a partial perspective view of a wheel carrier system in a raised configuration, according to embodiments of the present disclosure.

FIG. 4 is a partial perspective view of the wheel carrier system in a raised configuration. In the raised configuration the wheel carrier system 44 transitions the ground engaging tool system 94 into a raised configuration. In the raised configuration, the ground engaging tools 96 are rotated away from the wheels 46, 47 to block contact between the ground engaging tools 96 and the wheels 46, 47. In order to rotate the ground engaging tools 96, a link system 120 couples the wheel carrier arms 50, 52 to the ground engaging tool system 94. The link system 120 includes a first link 122, a second link 124, and a connecting bar 126. The first link 122 couples to the wheel carrier arm 50 with a shaft 128 (e.g., pin, bolt) and to one of the frames 98 with another shaft 130. The second link 124 couples to the wheel carrier arm 52 with a shaft 132 (e.g., pin, bolt) and to another frame 98 with another shaft 134.

As explained above, the wheel carrier arms 50, 52 rotate about the connections 53 in response to actuation (e.g., expansion, contraction) of the actuators 62. In FIG. 4, the actuators 62 are hydraulic actuators that expand in order to lower the wheels 46, 47 and lift the ground engaging tool system 94. As the actuators 62 extend, the actuators 62 rotate the wheel carrier arms 50, 52 about the connections 53 (e.g., pivot connections) in direction 64, which lowers the wheels 46, 47. The rotation of the wheel carrier arms 50, 52 is transferred through the links 122 and 124 to the frames 98. Accordingly, as the links 122 and 124 rotate with the wheel carrier arms 50, 52 the motion lifts and rotates the frames 98 about shafts 136. The frame 98 in turn rotates the ground engaging tools 96 via the arms 99 that couple to the frame 98. In some embodiments, the link system 120 includes a bar 126 that couples to the first link 122 and the second link 124. The bar 126 stabilizes and reinforces the first and second links 122, 124 as they rotate and lift the ground engaging tool system 94.

Figure 5:
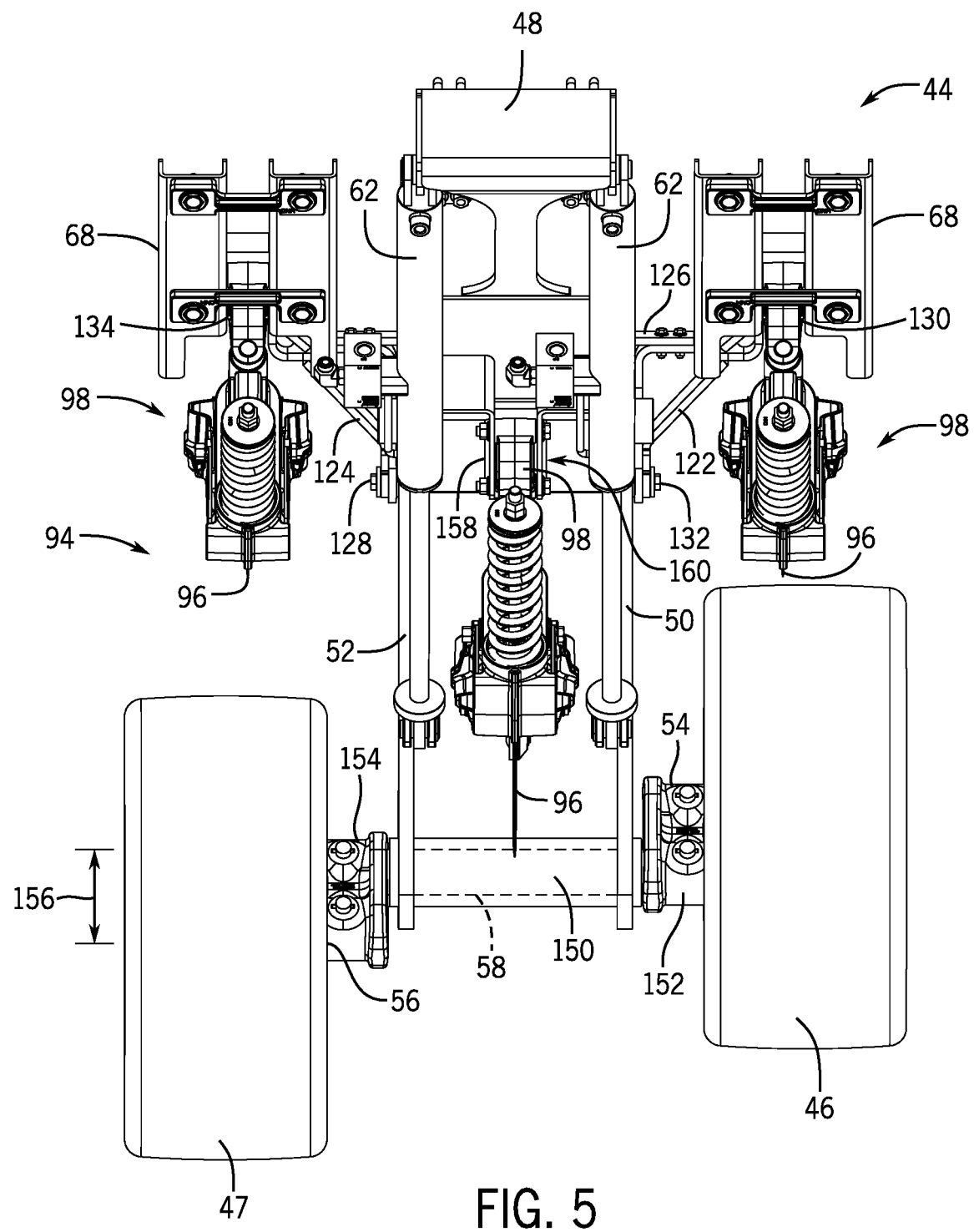
FIG. 5 is a top view of a wheel carrier system in a lowered configuration, according to embodiments of the present disclosure.

FIG. 5 is a top view of the wheel carrier system 44 in a raised configuration. As explained above, the wheel carrier system 44 includes two wheels 46, 47 (e.g., tandem wheels). The wheels 46, 47 couple to and rotate about respective wheel shafts 54, 56. The wheel shafts 54, 56 couple to central shaft 58, housed within the shaft housing 150, with connectors 152 and 154. In operation, the wheel shafts 54, 56 enable the wheels 46 and 47 to independently rotate and move vertically (e.g., up and down) relative to central shaft 58. For example, as the wheel carrier system 44 travels over uneven terrain the wheel 46 and/or 47 may encounter rocks, debris, depressions, hills, etc. As the wheels 46 and 47 traverse this uneven terrain, the wheels 46 and/or 47 may move independently (e.g., vertically) while still maintaining contact with the ground and evenly supporting the load. For example, as the wheel 46 moves vertically upward in response to contact with an obstacle (e.g., rock) the wheel 47 moves vertically downward to evenly support the load. The wheels 46 and 47 may move vertically a distance 156 relative to the central shaft 58. The distance 156 is the length of the connectors 152 and 154 between the centers of the respective wheel shafts 54 or 56 and the center of the central shaft 58.

As illustrated, the ground engagement tool system 94 may include a plurality of ground engaging tools 96. As explained above, some of these ground engaging tools 96 may rotate relative to the frame 48. More specifically, some of the ground engaging tools 96 may rotate relative to the frame 48 via the link system 120 that transfers movement of the wheel carrier arms 50 and 52 to the frames 98. Rotation of the ground engaging tools 96 is configured to block contact between the ground engaging tools 96 and the wheels 46 and 47. However, in some embodiments, the ground engaging tool system 94 may include additional ground engaging tools 96 that are not in the path (e.g., rotational path) of the wheels 46, 47. For example, the ground engaging tool system 94 may include a ground engaging tool 96 positioned between the wheels 46 and 47. This ground engaging tool 96 may couple directly to the frame 48. For example, the ground engaging tool 96 may couple to a flange 158 on the frame 48 with a shaft 160 (e.g., pin or bolt). In operation, instead of rotating this central ground engaging tool 96 and therefore lifting it out of the ground, the upward movement of the frame 48 lifts this ground engaging tool 96 out of the ground. In other words, the transition of the wheel carrier system 44 from a lowered to a raised configuration lifts this ground engaging tool 96 out of the ground.

FIG. 6 is a side view of the wheel carrier system 44 in a lowered configuration. As illustrated, the actuators 62 are in a contracted state, which rotates and lifts the wheel carrier arms 50, 52. In this position, the wheel carrier system 44 is supported by contact between the ground engaging tools 96 and the soil. However, in some situations it may be desirable to use the wheels 46 and 47 to support the ground engaging tool system 94 without lifting the ground engaging tools 96 out of the soil. For example, it may be desirable to support the ground engaging tool system 94 during encounters with excessively soft soil. Excessively soft soil may enable over penetration of the ground engaging tools 96 to an undesirable depth in the soil. FIG. 7 illustrates a side view of the wheel carrier system 44 in a support configuration. In the support configuration, the wheel carrier system 44 lowers the wheels 46 and 47 into contact with the soil in order to control the penetration depth of the ground engaging tools 96. In other words, the wheel carrier system 44 may control the depth of the ground engaging tools 96 without lifting and rotating them completely out of the ground. For example, the actuators 62 may extend a distance 170 that rotates the wheels 46, 47 into contact the soil without rotating the ground engaging tool system 94 (e.g., the ground engaging tools 96). In this position, the wheels 46, 47 block or reduce excessive penetration of the ground engaging tools 96 without lifting the ground engaging tools 96 completely out of the soil.

Technical effects of the invention include a wheel carrier system that reduces torsion on an agricultural implement. Another effect is a link system that transfers movement of the wheel carrier system to a ground engaging system to block contact between wheels of the wheel carrier system and ground engaging tools of a row unit. Still another effect is a tandem wheel system that enables load sharing on uneven terrain.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a wheel carrier system, comprising:
  a first wheel configured to couple to a first shaft;
  a first connector configured to couple the first shaft to a central shaft;
  a second wheel configured to couple to a second shaft;
  a second connector configured to couple the second shaft to the central shaft, wherein the first wheel and the second wheel are configured to independently rotate and move vertically;
  a shaft housing configured to support the central shaft;
  a first wheel carrier arm configured to couple to the shaft housing and to a wheel carrier frame;
  a first link configured to rotate a ground engaging tool system with respect to the wheel carrier frame to transition the ground engaging tool system from a lowered position to a raised position; and
  an actuator configured to simultaneously:
    rotate the first wheel carrier arm with respect to the wheel carrier frame from a first position to a second position; and
    rotate the ground engaging tool system from the lowered position to the raised position via the first link.

2. The system of claim 1, wherein the actuator comprises a hydraulic actuator, pneumatic actuator, electric actuator, or a combination thereof.

3. The system of claim 1, wherein the ground engaging tool system comprises a ground engaging tool frame configured to rotatingly couple to a mount of a row unit and to the first link.

4. The system of claim 3, wherein the ground engaging tool system comprises an arm configured to couple to the ground engaging tool frame and to a ground engaging tool.

5. The system of claim 4, wherein the ground engaging tool comprises a coulter disk.

6. The system of claim 1, wherein the first link is configured to couple to the first wheel carrier arm.

7. The system of claim 1, comprising a second wheel carrier arm.

8. The system of claim 7, comprising a second link configured to rotate the ground engaging tool system with respect to the wheel carrier frame to transition the ground engaging tool system from the lowered position to the raised position, wherein the second link is configured to couple to the second wheel carrier arm, and the actuator is configured to rotate the ground engaging tool system from the lowered position to the raised position via the first link and the second link.

9. The system of claim 1, comprising an agricultural implement, wherein the wheel carrier system is configured to couple to the agricultural implement.

10. The system of claim 9, comprising a row unit, wherein the row unit is configured to couple to the agricultural implement.

11. An agricultural implement system, comprising:
a row unit comprising:
a ground engaging tool system configured to engage soil with a ground engaging tool;
a wheel carrier system coupled to the ground engaging tool system, comprising:
a first wheel carrier arm configured to couple to a first wheel and to a wheel carrier frame;
a second wheel carrier arm configured to couple to a second wheel and to the wheel carrier frame;
a first link configured to rotate the ground engaging tool system with respect to the wheel carrier frame to transition the ground engaging tool system from a lowered position to a raised position; and
an actuator configured to simultaneously:
rotate the first wheel carrier arm and the second wheel carrier arm with respect to the wheel carrier frame from a first position to a second position; and
rotate the ground engaging tool system from the lowered position to the raised position via the first link.

12. The system of claim 11, wherein the actuator comprises a hydraulic actuator, pneumatic actuator, electric actuator, or a combination thereof.

13. The system of claim 11, wherein the ground engaging tool system comprises a ground engaging tool frame configured to rotatingly couple to a mount of the row unit and configured to couple to the first link.

14. The system of claim 13, wherein the ground engaging tool system comprises an arm configured to couple to a ground engaging tool frame and to a ground engaging tool.

15. The system of claim 14, wherein the ground engaging tool comprises a coulter disk.

16. The system of claim 11, wherein the first link is configured to couple to the first wheel carrier arm.

17. The system of claim 11, comprising a shaft housing configured to couple to the first wheel carrier arm and the second wheel carrier arm.

18. The system of claim 11, comprising a second link configured to rotate the ground engaging tool system with respect to the wheel carrier frame to transition the ground engaging tool system from the lowered position to the raised position, wherein the second link is configured to couple to the second wheel carrier arm, and the actuator is configured to rotate the ground engaging tool system from the lowered position to the raised position via the first link and the second link.

19. An agricultural implement system, comprising:
a row unit configured to couple to a toolbar, the row unit comprising:
a ground engaging tool system configured to engage soil with a ground engaging tool;
a wheel carrier system configured to couple to the toolbar and to the ground engaging tool system, comprising:
a wheel carrier arm configured to couple to a wheel and to a wheel carrier frame;
a link configured to rotate the ground engaging tool system with respect to the wheel carrier frame to transition the ground engaging tool system from a lowered position to a raised position; and
an actuator configured to simultaneously:
rotate the ground engaging tool system via the link; and
rotate the wheel carrier arm with respect to the wheel carrier frame from a first position to a support position without rotating the ground engaging tool system out of the ground.

20. The system of claim 19, wherein the actuator comprises a hydraulic actuator, pneumatic actuator, electric actuator, or a combination thereof.

* * * * *